(12) United States Patent
Fertman et al.

(10) Patent No.: US 11,652,226 B2
(45) Date of Patent: May 16, 2023

(54) HYDROGEN DEVELOPING BODY AND PROCESS OF MAKING THE SAME

(71) Applicant: 2706649 Ontario Ltd, Aurora (CA)

(72) Inventors: Mark Fertman, Toronto (CA); Gerard Campeau, Newmarket (CA)

(73) Assignee: 2706649 Ontario Ltd, Ontario (CA)

(*) Notice: Subject to any disclaimer, the term of this patent is extended or adjusted under 35 U.S.C. 154(b) by 0 days.

(21) Appl. No.: 17/180,403

(22) Filed: Feb. 19, 2021

(65) Prior Publication Data
US 2021/0257639 A1 Aug. 19, 2021

(30) Foreign Application Priority Data
Feb. 19, 2020 (EP) .................... 20158224

(51) Int. Cl.
*H01M 8/0656* (2016.01)
*C23C 24/04* (2006.01)

(52) U.S. Cl.
CPC .......... *H01M 8/0656* (2013.01); *C23C 24/04* (2013.01)

(58) Field of Classification Search
None
See application file for complete search history.

(56) References Cited

U.S. PATENT DOCUMENTS

| | | | |
|---|---|---|---|
| 3,131,664 A | 5/1964 | McInvale | |
| 3,674,447 A | 7/1972 | Bellis | |
| 3,942,511 A * | 3/1976 | Black | C01B 3/061 126/263.05 |
| 5,256,501 A | 10/1993 | Hasvold et al. | |
| 5,285,798 A | 2/1994 | Banerjee et al. | |
| 6,066,406 A | 5/2000 | McComas | |
| 6,834,623 B2 | 12/2004 | Cheng | |
| 8,974,927 B2 | 3/2015 | Fertman | |
| 2006/0024447 A1 | 2/2006 | McComas | |
| 2006/0251910 A1 | 11/2006 | Lancsek | |
| 2007/0059584 A1 | 3/2007 | Nakano | |
| 2008/0170327 A1 | 7/2008 | Machida | |
| 2008/0274671 A1 * | 11/2008 | O'Donoghue | C23C 16/0227 451/39 |
| 2009/0011297 A1 | 1/2009 | Jang et al. | |
| 2009/0075156 A1 | 3/2009 | Long et al. | |
| 2009/0123777 A1 | 5/2009 | McComas | |
| 2009/0280054 A1 | 11/2009 | Parker et al. | |
| 2012/0301751 A1 * | 11/2012 | Fertman | H01M 6/34 429/8 |
| 2018/0057944 A1 | 3/2018 | Mohammadian | |
| 2020/0036002 A1 | 1/2020 | Chakraborty et al. | |

FOREIGN PATENT DOCUMENTS

| | | |
|---|---|---|
| CN | 108528712 A | 9/2018 |
| CN | 108688785 A | 10/2018 |
| EP | 2528145 A1 | 11/2012 |
| EP | 2706608 A1 | 3/2014 |
| EP | 2830135 A1 | 1/2015 |
| WO | 8707311 A1 | 12/1987 |
| WO | 2017004777 A1 | 1/2017 |
| WO | 2018081904 A1 | 5/2018 |

OTHER PUBLICATIONS

European Patent Office, Communication Pursuant to Article 94(3) EPC, dated May 19, 2020 in Patent Application No. EP19214329.5.
European Patent Office, Extended European Search Report pursuant to Rule 62 EPC, dated Nov. 6, 2020 in Patent Application No. 19212000.4.
European Patent Office, Communication Pursuant to Article 94(3) EPC, dated Nov. 13, 2020 in Patent Application No. EP20177412.
"FCair—The Complete Hydrogen Solution for Commercial UAVs"; obtained at https://info.ballard.com/informational-complete-hydrogen-uav-solution; Dec. 2020.
"Submarines—ThyssenKrupp Marine Systems"; obtained at https://www.thyssenkrupp-marinesystems.com/en/products-services/submarines; Dec. 2020.
"Pioneers in the submarine market"; obtained at https://www.siemens-energy.com/global/en/offerings/industrial-applications/marine/submarines.html; Dec. 2020.
European Patent Office, Extended European Search Report pursuant to Rule 62 EPC, dated Dec. 15, 2020 in Patent Application No. 19212000.4.
European Patent Office, Communication Pursuant to Article 94(3) EPC, dated Jan. 29, 2021 in Patent Application No. EP20192053.
European Patent Office, Communication Pursuant to Article 94(3) EPC, dated Feb. 15, 2021 in Patent Application No. EP20177412.
Khrussanova, M. et al.; "Hydriding of Mechanically Alloyed Mixtures of Magnesium with $MnO_2$, $Fe_2O_3$ and NiO"; downloaded on Aug. 23, 2021 at https://www.sciencedirect.com/science/article/abs/pii/0025540891900987; Jul. 1991.
Wang, Jiasheng, et al.; "Effects of Fe Modified $Na_2WO_4$ Additive on the Hydrogen Storage Properties of $MgH_2$"; downloaded Aug. 23, 2021 at https://link.springer.com/article/10.1007/s11595-019-2155-2?utm_source=xmol&utm_medium=affiliate&utm_content=meta&utm_campaign=DDCN_1_GL01_metadata; Oct. 2019.
European Patent Office, Communication Pursuant to Article 94(3) EPC, dated Jul. 22, 2020 in Patent Application No. EP20158224.4, which is a foreign counterpart application.

(Continued)

*Primary Examiner* — Michael P. Rodriguez
(74) *Attorney, Agent, or Firm* — Kolitch Romano Dascenzo Gates LLC

(57) ABSTRACT

A hydrogen-developing body of an apparatus for producing hydrogen from an electrolyte solution is disclosed. The hydrogen-developing body is formed from magnesium (Mg) or zinc (Zn) or the like, or an alloy thereof, or has an electrolyte-contacting surface which is formed from magnesium (Mg) or zinc (Zn) or the like, or an alloy thereof. The electrolyte-contacting surface has regions formed from iron (Fe) or a Fe alloy, or the like, which are pellet-shaped and stochastically embedded into the surface such that the Fe/Fe alloy pellets are exposed to the environment of the body.

20 Claims, No Drawings

(56) References Cited

OTHER PUBLICATIONS

Zhang, Peili, et al.; "Electroless plated Ni-Bx films as highly active electrocatalysts for hydrogen production from water over a wide pH range," Nano Energy, vol. 19, pp. 98-107, Jan. 2016.

\* cited by examiner

HYDROGEN DEVELOPING BODY AND PROCESS OF MAKING THE SAME

INTRODUCTION

Hydrogen has been known as a fuel for quite a number of applications, in fuel cells or in combustion engines, in the latter applications replacing fossil fuels.

In light of climate change and the extremely environment-friendly nature of hydrogen-based drive systems, there is a huge future market for such systems. Therefore, there is a vast demand for hydrogen producing apparatus which can be manufactured at large scale and which allow the production of large amounts of hydrogen at low cost.

SUMMARY

The present disclosure provides systems, apparatuses, and methods relating to a hydrogen developing body of an apparatus for producing hydrogen from an electrolyte solution.

Features, functions, and advantages may be achieved independently in various embodiments of the present disclosure, or may be combined in yet other embodiments, further details of which can be seen with reference to the following description.

DETAILED DESCRIPTION

In general, the present disclosure relates to a hydrogen developing body of an apparatus for producing hydrogen from an electrolyte solution, the hydrogen developing body being formed from magnesium (Mg) or zinc (Zn) or the like, or an alloy thereof, or having an electrolyte-contacting surface which is formed from magnesium (Mg) or zinc (Zn) or the like, or an alloy thereof, the electrolyte-contacting surface comprising regions formed from iron (ferrum, Fe) or a Fe alloy, or the like.

It has been well-known for many years, to produce hydrogen from an aqueous electrolyte in an electrochemical process, in particular using hydrogen-generating elements made from magnesium (Mg) or zinc (Zn) or alloys thereof, or the like, in proximity to other elements or regions, respectively, which are formed from iron (Fe) or alloys thereof, or the like.

Herein, the wording "or the like" with respect to Mg or Fe designates chemical elements (or alloys therefrom) which in the electrochemical behavior are close to magnesium on the one hand or close to iron (ferrum) on the other, and which, therefore, could replace magnesium on the one hand and iron on the other, in their respective function as described below, at least to a certain extent. Among others, zinc (Zn) can, in principle, be used to replace magnesium, whereas on the other hand carbon might replace ferrum or, more specifically, steel.

Basic concepts in this regard have been developed, e.g., in U.S. Pat. No. 6,834,623, and this concept has meanwhile matured into semi-commercial products.

More recently, hydrogen developing elements have been disclosed in which the electrolyte-contacting surface of the hydrogen-developing body comprises at least a first sheet formed from Mg or an Mg alloy and a second sheet formed from Fe or a Fe alloy, the first and second sheet being closely bonded to each other. The first or the second sheet is basically continuous and correspondingly the second or the first sheet comprises a plurality of apertures the surface of the basically continuous sheet being capable to contact the electrolyte solution through the apertures of the non-continuous sheet.

A. Illustrative Device and Method

The present disclosure provides a hydrogen-developing body of an apparatus for producing hydrogen, which has an extremely simple configuration and can be manufactured at large scale in a low-cost production process. Also provided is a corresponding manufacturing process for such a hydrogen-developing body.

In the disclosed product, the regions formed from iron or an iron alloy or the like are pellet-shaped and stochastically embedded into the surface, such that the Fe pellets are exposed to the environment of the body. Thus, the surface (or surfaces) of the hydrogen-developing body which in an apparatus for producing hydrogen are in contact with the electrolyte solution has a stochastically mixed configuration of Mg or Zn regions and minute Fe islands, forming a large plurality of irregularly distributed interfaces at which hydrogen is developed.

In some embodiments, the surface ratio between the summed-up free surface of Fe pellets and the Mg or Zn surface is from 0.3 to 3.0, preferably from 0.6 to 2.0, more preferably from 0.8 to 1.5.

In further embodiments, the Fe pellets have average dimensions from 0.1 mm to 3 mm, preferably from 0.3 mm to 2 mm, and more preferably from 0.5 mm to 1.5 mm.

In further embodiments, the pellets are basically spherules or cylinders. According to experiments of the inventors, in advantageous embodiments, the Fe pellets comprise steel pellets, in particular cast steel pellets or steel wire corn. Such types of pellets are commercially available at very low cost and fulfill the requirements of an apparatus for producing hydrogen.

The hydrogen-developing body can, in particular, be plate-shaped, which enables an efficient mass production of its precursor. In other embodiments it can be prismatic or cylinder-shaped, depending on the intended geometrical configuration of the hydrogen-developing apparatus.

In further embodiments, the hydrogen developing body can have a predetermined surface roughness, in particular with an arithmetical mean height from 0.01 to 1 mm, preferably from 0.05 to 0.5 mm. Such surface roughness increases the contact area between the body surface and the surrounding electrolyte and can, thus, increase the efficiency of the hydrogen production.

The disclosed process for making the above-referenced hydrogen-developing bodies, is basically a modified sand blasting process, wherein the Fe pellets are blasted into the surface of a prefabricated body made from Mg or Zn or an alloy thereof or having a surface made from Mg or Zn or an alloy thereof, in a pressurized gas stream. In some examples, the gas stream is an air or nitrogen stream.

In embodiments of the invention, the pressure of the gas stream is from 5 to 15 bar, e.g., from 8 to 12 bar.

To obtain a satisfactory efficiency of the process, typically the flow rate of the gas stream is above 500 l/min. Depending on the parameters of a mass production process, pellet blasting apparatus of much higher flow rate can be provided.

For obtaining maximum efficiency of the manufacturing process, it may be appropriate to select magnesium or zinc alloys on the one hand and Fe alloys on the other, which have a suitable ratio of the respective hardness values. In this way, it can be made sure that a maximum amount of the pellets blasted to the surface of the Mg or Zn alloy, penetrate into the surface and are fixed therein. The basic principle, however, already works without such fine tuning of the respective materials, given that in any case Fe or Fe alloys have higher hardness than Mg or Zn or alloys thereof.

For obtaining the above-referenced surface roughness of the hydrogen developing body, in embodiments of the process the Fe pellets are mixed with glass beads or organic particles, for effecting that, in a single process step, the pellets penetrate into the surface and the surface assumes the predetermined roughness. In such embodiments, the hardness of the glass beads or organic particles should be adapted to the hardness of the Mg or Zn alloy, to obtain a desired surface profile without significant abrasion of the surface. As organic particles, nutshell particles or similar can advantageously be used.

The average dimensions of the glass beads or organic particles can be from 0.1 mm to 3 mm, preferably from 0.3 mm to 2 mm, and more preferably from 0.5 mm to 1.5 mm.

The implementation of the invention is not restricted to the above-referenced aspects but is possible in many combinations and modifications thereof, which are within the scope of the appending claims and within the knowledge of one of ordinary skill in the art.

B. Illustrative Combinations and Additional Examples

This section describes additional aspects and features of hydrogen developing bodies of an apparatus for producing hydrogen from an electrolyte solution, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A hydrogen developing body of an apparatus for producing hydrogen from an electrolyte solution, the hydrogen developing body being formed from magnesium, Mg, or zinc, Zn, or the like, or an alloy thereof, or having an electrolyte-contacting surface which is formed from magnesium, Mg, or zinc, Zn, or the like, or an alloy thereof, the electrolyte-contacting surface comprising regions formed from ferrum, Fe, or a Fe alloy, or the like, which are pellet-shaped and stochastically embedded into the surface such that the Fe pellets are exposed to the environment of the body.

A1. The hydrogen developing body of A0, wherein the pellets are basically spherules or cylinders.

A2. The hydrogen developing body of AC or A1, wherein the Fe pellets have average dimensions from 0.1 mm to 3 mm, preferably from 0.3 mm to 2 mm, and more preferably from 0.5 mm to 1.5 mm.

A3. The hydrogen developing body of any one of AC through A2, wherein the Fe pellets comprise steel pellets, in particular cast steel pellets or steel wire corn.

A4. The hydrogen developing body of any one of AC through A3, being plate-shaped.

A5. The hydrogen developing body of any one of AC through A4, having a predetermined surface roughness, in particular with an arithmetical mean height from 0.01 to 1 mm, preferably from 0.05 to 0.5 mm.

A6. The hydrogen developing body of any one of AC through A5, wherein the surface ratio between the summed-up free surface of Fe pellets and the Mg or Zn surface is from 0.3 to 3.0, preferably from 0.6 to 2.0, more preferably from 0.8 to 1.5.

B0. Process of making a hydrogen developing body of any of the preceding claims, wherein the Fe pellets are blasted to the surface of a prefabricated body made from Mg or Zn or an alloy thereof or having a surface made from Mg or Zn or an alloy thereof, in a pressurized gas stream.

B1. The process of B1, wherein the gas stream is an air or nitrogen stream.

B2. The process of BC or B1, wherein the Fe pellets are mixed with glass beads or organic particles, for effecting that, in a single process step, the pellets penetrate into the surface and the surface assumes the predetermined roughness.

B3. The process of any one of BC through B2, wherein the pressure of the gas stream is from 5 to 15 bar, in particular from 8 to 12 bar.

B4. The process of any one of BC through B3, wherein the flow rate of the gas stream is above 500 l/min.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A hydrogen-developing body of an apparatus for producing hydrogen from an electrolyte solution, comprising:
    a hydrogen-developing body having an electrolyte-contacting surface comprising magnesium (Mg) or zinc (Zn), or an alloy of Mg or Zn;
    the electrolyte-contacting surface comprising pellets of iron (Fe) or a Fe alloy;
    wherein the pellets are stochastically embedded into the electrolyte-contacting surface, such that the pellets are exposed to an environment of the body, and an interior of the body comprises a body material free from the pellets.

2. The hydrogen-developing body of claim 1, wherein the pellets are spherules or cylinders.

3. The hydrogen-developing body of claim 1, wherein the pellets have average dimensions from 0.1 mm to 3 mm.

4. The hydrogen-developing body of claim 1, wherein the pellets comprise steel pellets.

5. The hydrogen-developing body of claim 1, wherein the body is plate-shaped.

6. The hydrogen-developing body of claim 1, wherein the body has a surface roughness with an arithmetical mean height from 0.01 to 1 mm.

7. The hydrogen-developing body of claim 1, wherein a surface ratio between a summed-up free surface of the pellets and the Mg or Zn electrolyte-contacting surface is from 0.3 to 3.0.

8. A process of making the hydrogen-developing body of claim 1, the process comprising:
blasting the pellets, in a pressurized gas stream, into a surface of a prefabricated body;
wherein the prefabricated body comprises Mg or Zn, or an alloy of Mg or Zn, or wherein the surface of the prefabricated body comprises Mg or Zn, or an alloy of Mg or Zn.

9. The process of claim 8, wherein the gas stream is an air or nitrogen stream.

10. The process of claim 8, wherein the pellets are mixed with glass beads or organic particles, such that, in a single process step, the pellets penetrate into the surface and the glass beads or organic particles cause the surface to assume a predetermined roughness.

11. The process of claim 8, wherein a pressure of the gas stream is from 5 to 15 bar.

12. The process of claim 8, wherein a flow rate of the gas stream is above 500 l/min.

13. A hydrogen-developing body of an apparatus for producing hydrogen from an electrolyte solution, comprising:
a prefabricated hydrogen-developing body comprising magnesium (Mg) or zinc (Zn) or an alloy of Mg or Zn, the prefabricated body having an electrolyte-contacting surface, and the electrolyte-contacting surface having a Plurality of pellets blasted into the electrolyte-contacting surface such that the pellets are exposed to an environment of the body;
wherein the pellets comprise iron (Fe) or a Fe alloy.

14. The hydrogen-developing body of claim 13, wherein the pellets are spherules or cylinders.

15. The hydrogen-developing body of claim 13, wherein the pellets have average dimensions from 0.1 mm to 3 mm.

16. The hydrogen-developing body of claim 13, wherein the pellets comprise steel pellets.

17. The hydrogen-developing body of claim 16, wherein the steel pellets are cast steel pellets.

18. The hydrogen-developing body of claim 13, wherein the prefabricated body is plate-shaped.

19. The hydrogen-developing body of claim 13, wherein the prefabricated body has a surface roughness with an arithmetical mean height from 0.01 to 1 mm.

20. The hydrogen-developing body of claim 13, wherein a surface ratio between a summed-up free surface of the pellets and the Mg or Zn electrolyte-contacting surface is from 0.3 to 3.0.

* * * * *